United States Patent
Tourapis et al.

(10) Patent No.: US 9,215,435 B2
(45) Date of Patent: Dec. 15, 2015

(54) METHOD FOR EMBEDDING SUBTITLES AND/OR GRAPHIC OVERLAYS IN A 3D OR MULTI-VIEW VIDEO DATA

(75) Inventors: Alexandros Tourapis, Milpitas, CA (US); Sean Fitzpatrick, Burbank, CA (US)

(73) Assignee: DOLBY LABORATORIES LICENSING CORP., San Francisco, CA (US)

( * ) Notice: Subject to any disclaimer, the term of this patent is extended or adjusted under 35 U.S.C. 154(b) by 1028 days.

(21) Appl. No.: 13/380,020

(22) PCT Filed: Jun. 22, 2010

(86) PCT No.: PCT/US2010/039547
§ 371 (c)(1),
(2), (4) Date: Dec. 21, 2011

(87) PCT Pub. No.: WO2010/151555
PCT Pub. Date: Dec. 29, 2010

(65) Prior Publication Data
US 2012/0092454 A1    Apr. 19, 2012

Related U.S. Application Data

(60) Provisional application No. 61/237,126, filed on Aug. 26, 2009, provisional application No. 61/220,007, filed on Jun. 24, 2009.

(51) Int. Cl.
*H04N 13/00* (2006.01)
*H04N 13/02* (2006.01)

(52) U.S. Cl.
CPC ......... *H04N 13/0003* (2013.01); *H04N 13/004* (2013.01); *H04N 13/007* (2013.01); *H04N 13/0048* (2013.01); *H04N 13/0282* (2013.01); *H04N 13/0292* (2013.01)

(58) Field of Classification Search
CPC ...................... H04N 13/0003; H04N 13/0062
See application file for complete search history.

(56) References Cited

U.S. PATENT DOCUMENTS 4,859,994 A    8/1989    Zola et al.
5,615,046 A    3/1997    Gilchrist
(Continued)

FOREIGN PATENT DOCUMENTS

CN    1947430    4/2007
DE    19545356 A1    5/1996
(Continued)

OTHER PUBLICATIONS

Written Opinion for PCT Application No. PCT/US2010/039543 filed on Jun. 22, 2010 in the name of Dolby Laboratories Licensing Corporation; mail date: Oct. 12, 2011.
(Continued)

*Primary Examiner* — Sath V Perungavoor
*Assistant Examiner* — James Pontius
(74) *Attorney, Agent, or Firm* — Steinfl & Bruno LLP

(57) ABSTRACT

A method for embedding subtitles and/or graphic overlays in a 3D or multi-view video application is described. The subtitles and/or graphic overlays are provided separately for each view of the 3D or multi-view video application. The views with the subtitles and/or graphic overlays are then processed to form a subtitled and/or graphic overlaid 3D or multi-view video application.

24 Claims, 3 Drawing Sheets

(56) References Cited

U.S. PATENT DOCUMENTS

| | | | |
|---|---|---|---|
| 6,631,205 | B1 | 10/2003 | Melen et al. |
| 6,944,328 | B2 | 9/2005 | Yoshida |
| 7,015,920 | B2 | 3/2006 | Ono |
| 7,046,270 | B2 | 5/2006 | Murata et al. |
| 7,075,587 | B2 | 7/2006 | Lee |
| 7,177,357 | B2 | 2/2007 | Yun et al. |
| 7,274,816 | B2 | 9/2007 | Yoshida |
| 7,692,640 | B2 | 4/2010 | Van Geest |
| 7,787,658 | B2 | 8/2010 | Redert |
| 2003/0103062 | A1 | 6/2003 | Lee et al. |
| 2006/0103664 | A1 | 5/2006 | Nakanishi |
| 2007/0008575 | A1 | 1/2007 | Yu et al. |
| 2007/0035618 | A1* | 2/2007 | Yoshida .................. 348/43 |
| 2007/0041444 | A1 | 2/2007 | Guiterrez |
| 2007/0146232 | A1 | 6/2007 | Redert |
| 2007/0288844 | A1 | 12/2007 | Zingher et al. |
| 2008/0303813 | A1 | 12/2008 | Joung et al. |
| 2009/0092335 | A1 | 4/2009 | Kim et al. |
| 2009/0142041 | A1 | 6/2009 | Nagasawa et al. |
| 2009/0315979 | A1 | 12/2009 | Jung et al. |
| 2010/0021141 | A1 | 1/2010 | Yamashita et al. |
| 2011/0135005 | A1 | 6/2011 | Tourapis et al. |
| 2011/0170792 | A1 | 7/2011 | Tourapis et al. |
| 2011/0242104 | A1* | 10/2011 | Zhang et al. ............... 345/419 |

FOREIGN PATENT DOCUMENTS

| | | |
|---|---|---|
| EP | 1744564 | 1/2007 |
| EP | 1912446 | 4/2008 |
| JP | 2003009185 | 1/2003 |
| JP | 2004274125 | 9/2004 |
| WO | 9837698 | 8/1998 |
| WO | 9930280 | 6/1999 |
| WO | 0180548 | 10/2001 |
| WO | 2004030375 | 4/2004 |
| WO | 2004059980 | 7/2004 |
| WO | 2006111893 | 10/2006 |
| WO | 2007064159 | 6/2007 |
| WO | 2007066868 | 6/2007 |
| WO | 2008030011 | 3/2008 |
| WO | 2008038025 | 4/2008 |
| WO | 2008038205 | 4/2008 |
| WO | 2008044191 | 4/2008 |
| WO | 2008063170 | 5/2008 |
| WO | 2008115222 | 9/2008 |
| WO | 2008122838 | 10/2008 |
| WO | 2008150111 | 12/2008 |
| WO | 2010064118 | 6/2010 |
| WO | 2010070567 | 6/2010 |
| WO | 2011005544 | 1/2011 |
| WO | 2011006104 | 1/2011 |

OTHER PUBLICATIONS

International Preliminary Report on Patentability for PCT Application No. PCT/US2010/039543 filed on Jun. 22, 2010 in the name of Dolby Laboratories Licensing Corporation; mail date: Oct. 12, 2011.
PCT International Preliminary Report on Patentability with Annex of International Application PCT/US2010/039547 filed on Jun. 22, 2010 in the name of Dolby Laboratories Licensing Corporation.
PCT International Search Report of International Application PCT/US2010/039547 filed on Jun. 22, 2010 in the name of Dolby Laboratories Licensing Corporation.
PCT Informal Communication of International Application PCT/US2010/039547 filed on Jun. 22, 2010 in the name of Dolby Laboratories Licensing Corporation.
Response to PCT Informal Communication of International Application PCT/US2010/039547 filed on Jun. 22, 2010 in the name of Dolby Laboratories Licensing Corporation.
PCT Written Opinion of International Application PCT/US2010/039547 filed on Jun. 22, 2010 in the name of Dolby Laboratories Licensing Corporation.
Response to PCT Written Opinion of International Application PCT/US2010/039547 filed on Jun. 22, 2010 in the name of Dolby Laboratories Licensing Corporation.
PCT International Preliminary Report on Patentability with Annex of International Application PCT/US2010/039543 filed on Jun. 22, 2010 in the name of Dolby Laboratories Licensing Corporation.
PCT International Search Report of International Application PCT/US2010/039543 filed on Jun. 22, 2010 in the name of Dolby Laboratories Licensing Corporation.
Response to Informal Communication of International Application PCT/US2010/039543 filed on Jun. 22, 2010 in the name of Dolby Laboratories Licensing Corporation.
English translation of the First Office Action for Chinese Patent Application No. 201080027974.9 filed on Jun. 22, 2010 in the name of Dolby Laboratories Licensing Corporation, issued on Jan. 6, 2014.
English Translation of the Search Report for Chinese Patent Application No. 201080027974.9 filed on Jun. 22, 2010 in the name of Dolby Laboratories Licensing Corporation, issued on Jan. 6, 2014.
Chinese Office Action issued on Aug. 26, 2014 for Chinese Application 20100027974.9 filed on Jun. 22, 2010 in the name of Dolby Laboratories Licensing Corporation (English translation only).
Hutchison, D., Introducing DLP 3-D TV, DLP Texas Instruments, 1-5.
McCormick, et al., Implementation of stereoscopic and dualview images on a micro-display high definition television, 3DTV-Con'08, May 28-30, 2008, 33-36.
Gali-3D, Adding stereoscopic subtitles to your movies by the help of ffdshow, retrieved on Mar. 31, 2011 from http://www.gali-3d.com/archive/articles/ffdshow-manual/ffdshow_stereo_subtitles.php.
Koster, et al., Use two video-display processors to achieve 3-D, overlay effects, EDN May 31, 1984, 135-148.
3dTV virtual realities stereoscopic subtitle guide, retrieved on Mar. 31, 2011 from http://www.3dtv.at/Knowhow/Subtitles_en.aspx.

* cited by examiner

METHOD FOR EMBEDDING SUBTITLES AND/OR GRAPHIC OVERLAYS IN A 3D OR MULTI-VIEW VIDEO DATA

CROSS REFERENCE TO RELATED APPLICATIONS

This application is the U.S. national stage of International Application PCT/US2010/039547 filed on Jun. 22, 2010, which in turn claims priority to U.S. Provisional Application No. 61/220,007 filed on Jun. 24, 2009 and U.S. Provisional Application No. 61/237,126 filed Aug. 26, 2009 hereby incorporated by reference in its entirety.

FIELD

The present disclosure relates to 3D or multi-view video applications. More in particular, it relates to a method for embedding subtitles and/or graphic overlays in a 3D or multi-view video application.

BACKGROUND 3D video applications in the consumer space have garnered great interest in the last few years since they are expected to further enhance a user's home multimedia experience but also since they are expected to revitalize certain applications such as High Definition DVD formats (i.e. Blu-ray). Nevertheless, several formats have been proposed for the delivery of 3D video into the home, separated primarily in three categories, frame compatible, 2D compatible, and 2D+depth formats. Each one of these categories has different benefits but also drawbacks and no clear winner in terms of the delivery format has been established.

Frame compatible formats rely on subsampling and multiplexing methods for the delivery of 3D data. More specifically, the left and right views are first subsampled to a lower resolution image given a particular filtering and subsampling mechanism. Common methods for subsampling include horizontal, vertical, and quincunx sampling. Multiplexing methods may include side by side (see FIG. 1(a)), over-under (see FIG. 1(b)), line interleaved, and checkerboard packing among others. In some cases, especially for side by side and over-under arrangements, one of the views may be inverted compared to the other view. These videos can be encoded using existing or potentially future codecs that better exploit the characteristics of the signal, while after the decoding process a device, i.e. a display, is provided with a single frame that now consists of the two sampled and multiplexed stereo images together. This device may have to demultiplex and then upsample the images for display or other purposes. The device may also have to reformat, i.e. convert from a format A such as side by side to a format B, such as line interleaved/line by line or checkerboard before display.

A major component of any video delivery system is the support of subtitles and graphic overlays. Existing systems, however, assume that the video is always in a 2D compatible format, i.e. that a single image corresponding to a scene covers the entire frame. See, for example, a conventional way of embedding subtitles in side by side and over-under packed video images, shown in FIG. 2(a) and FIG. 2(b). Unfortunately, frame compatible 3D formats complicate support for subtitles and graphic overlays. This also can affect some formats more than others. More specifically, formats such as "quincunx sampling+checkerboard interleaving", "vertical sampling+line interleaving", or "horizontal sampling+column interleaving" have less trouble in handling overlays and subtitles since these formats are pixel aligned with this additional information as embedded today. Unfortunately, this is not true for other formats, such as side by side (regardless of the sampling method), or over-under since the traditional way of embedding overlays in the video signal, i.e. across the entire frame, would be inappropriate and would result in a corruption of the overlay or subtitle text. This implies that one would have to either modify the decoder to support such overlays and render them differently for 3D applications. In an alternative method, and assuming that the graphic overlay or subtitles were added previously in a different part of the decoding & delivery chain, these have to be detected, extracted and re-embedded into the video, after also correcting, e.g. using inpainting or other techniques, any artifacts introduced from the original, not properly formatted and embedded overlays.

SUMMARY

According to a first aspect, a method for embedding subtitles and/or graphic overlays in a 3D or multi-view video application is disclosed, comprising: providing a plurality of two or more views, wherein view disparities are present between the views in order to allow subsequent formation of the 3D or multi-video application; providing the subtitles and/or graphic overlays separately for each view based on the view disparities; processing the plurality of two or more views and the subtitles and/or graphic overlays to form a subtitled and/or overlaid 3D or multi-view video application.

Further aspects of the present disclosure are provided in the specification, claims and drawings of the present application.

DESCRIPTION OF EXAMPLE EMBODIMENTS

Figure 1:
FIG. 1(a) shows a side by side packing of a video image.
FIG. 1(b) shows an over-under packing of a video image.
Figure 2:
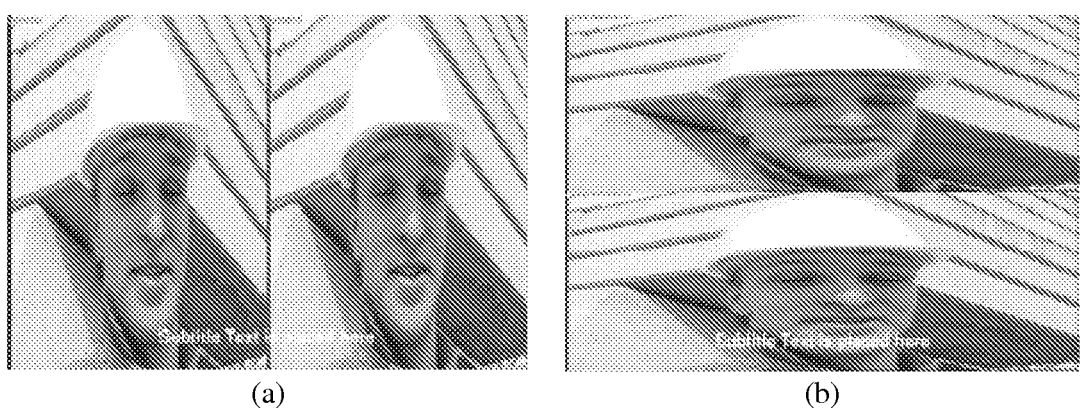
FIG. 2(a) shows a conventional way of embedding subtitles in a side by side packed video image.
FIG. 2(b) shows a conventional way of embedding subtitles in an over-under packed video image.
Figure 3:
FIGS. 3(a) and 3(b) show embedded subtitles according to an embodiment of the present disclosure.
Figure 4:
FIGS. 4(a) and 4(b) show embedded subtitles and graphic overlays according to an embodiment of the present disclosure.

In the present disclosure a solution to the above mentioned problem is provided which is currently compatible with existing players, such as set-top box, Blu-ray players, software decoders etc and enables frame compatible 3D bitstreams to carry high quality subtitles or graphic overlays without requiring any further modification in the software or hardware of these systems.

According to an aspect of the present disclosure, a method for embedding subtitles and/or graphic overlays in a 3D or multi-view video application is provided, comprising: providing a plurality of two or more views, wherein view disparities are present between the views in order to allow subsequent formation of the 3D or multi-video application; providing the subtitles and/or graphic overlays separately for each view based on the video disparities; processing the plurality of two or more views and the subtitles and/or graphic overlays to form a subtitled and/or overlaid 3D or multi-view video application.

In particular, in the system according to the present disclosure, instead of embedding a subtitle track on the video with a single subtitle text or graphic overlay event, two (or multiple in the case of multiview systems) sub-title or graphic overlay events are embedded, one for each different view, as shown in FIGS. 3(a), 3(b), 4(a) and 4(b).

Throughout the present disclosure, elements such as subtitles, buttons, arrows, captions, banners and picture in picture information will be generically described as "overlays". Overlays other than subtitles will also be defined as "graphic overlays," since subtitles are usually rendered given text fonts, while other kinds of overlays may be defined using vector graphics or raster graphics and may use, in the case of vector graphics, a graphics engine for rendering purposes. That is, vector graphics based overlays are primarily specified using mathematical formulas, which need to be computed in order to construct an output image. However, both subtitles and graphic overlays are overlaid on top of the content in a similar manner. These events are properly aligned and formatted given the format used, e.g. side by side or over under, but also the sampling process (quincunx vs. horizontal vs. vertical). In the quincunx side by side for example case, the fonts are created by first sampling the fonts using quincunx sampling and then packed horizontally.

Embedding multiple such objects in a video stream is completely compliant with existing transport layer systems such as MPEG-2 and MPEG-4, and devices such as Blu-ray players and set-top box devices. Even though adding multiple such objects in the video, the cost is negligible in terms of processing power (decoding the actual video information requires considerably more resources) and is already supported by such devices. This implies that no modification is necessary to existing devices, considerably reducing the cost of consumer electronics manufacturers and therefore their revenue.

The embedding of separate subtitle or/and graphic overlay events for each view actually adds some additional capabilities during playback. More specifically, this enables the creation of 3D subtitle text and graphic overlays, which can considerably enhance the user's experience when watching 3D content. For example, even though both views for a 3D application contain the same text data and the basic font for each view is the same, the actual character representations are provided using a 3D representation. This implies that the left font may be slightly different compared to the right font (e.g., offset by a few pixels towards the left or right, with a slightly different shade orientation, if available, based on the 3D characteristics of the font, with slightly different colors or outlines, sharpness, etc). The same can also be extended to fonts for multiview representations, where one would consider again different font orientation, color, sharpness, etc. This will result in the user being able to see subtitle text or/and graphic overlays in 3D.

Figure 5:
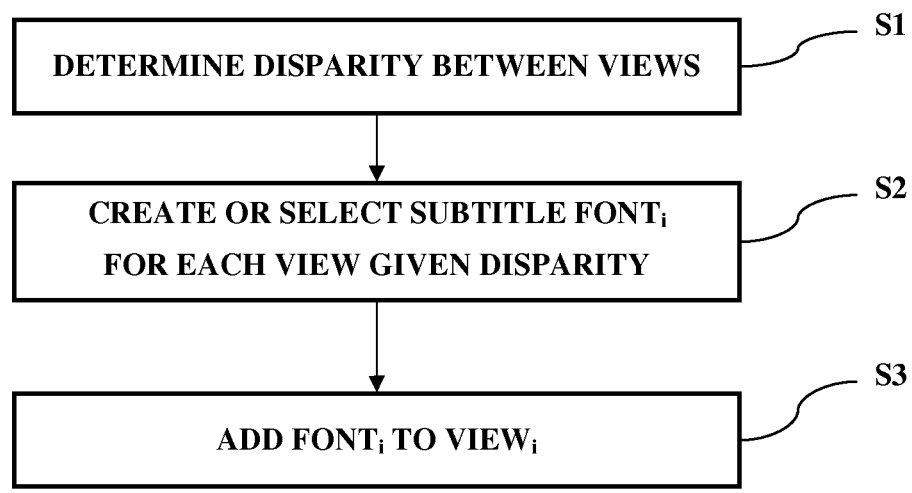
FIG. 5 shows a flow chart where subtitles and/or graphic overlays are added to left/right or multiple views based on the disparity between the views.

As shown in the exemplary flow chart of FIG. 5, a disparity between views (left/right or multiple views), that is the differences in image location of an object as seen by each eye, is determined (step S1). This 'binocular' disparity is primarily a result of the eyes' and in the case of video signals the cameras' horizontal separation. Based on the determined disparity, a subtitle font is created or selected for each view (step S2) and then added to each view (step S3). Together with the font selection, or alternatively to that, other features or characteristics can be selected for each view, such as position, size and angle of the font. Therefore, selection of the font and/or other features of the overlays can be controlled view by view in dependence of the disparity between views in order to obtain a desired overlay in 3D.

An additional advantage is that during post-production, the producer may select to change at which depth this information is presented by appropriately adjusting the two fonts. In a certain embodiment, a video editing and/or authoring system provisioned with an automatic 3D font generation system which generates left and right, or multi-view, fonts automatically given input from a user (i.e., where in terms of depth subtitle text or graphic overlays are presented within a 3D scene). This can also be done during playback by the end user. A video authoring system is a tool that allows the editing and creation of a DVD, Blu-ray, or other multimedia storage format, including online multimedia formats. The editing process may include any modifications to the video and audio signals, such as cropping, scaling, creation of different transitions etc, placement of video clips at different time intervals, and creation of menus, graphics, and subtitles in different languages among others.

The video system in this scenario allows the user to create, capture or import 2D or 3D video signals, create or import subtitle text or other graphics data in 2D and 3D, and overlay them over appropriate positions over the video.

The authoring system allows 2D authoring, but can also enable 3D authoring using appropriate displays and glasses enabling the author to better visualize the 3D effect. The author may be able to specify depth information explicitly, or be able to move and visualize where such overlay information is placed in space, or even move these objects directly in 2D space without having a true visualization method but by estimating the 3D effect that may be perceived. The system can, however, provide information to the user such as "maximum" and "minimum" depth information and depth map charts, which can be 2D or 3D images that can help the author visualize the depth characteristics of a scene, i.e. what is the depth of an object or pixel given a zero depth position which is usually the screen plane. The depth information about the graphical objects can give further flexibility and insight to the user of how to best author such information.

The fonts could be generated and attached to the video file in a form like OpenType or Truetype or other formats, such as Type 1 (PostScript), that may be supported by a device or video file format/system. Fonts could be vector or raster (bitmap) based. Vector based fonts are specified using mathematical formulas which describe each glyph, allowing the font to be easily scaled at any resolution. On the other hand, bitmap fonts are already pre-rendered at specific resolutions only, pixel by pixel. Text could also be pre-rendered (i.e. be present as an overlay image with transparency information). Multiple fonts could be embedded for the entire sequence, which could enable the use of different depths given different scenes. In particular, one may have one font that corresponds to depth 0, another for depth 10, a third for depth 15 etc. Depending on the depth that a content author wishes to apply on a particular pixel, region/segment, where the segment can be a predefined area or an automatically selected area, using for examples object segmentation tools, within an image, or object within the scene, the appropriate text is signaled and used within the video. Such option may also be provided to the viewer, where the viewer may desire to bring the subtitles forward or backward by selecting different subtitles each authored with the different font type.

The number of fonts and the type of fonts available can depend on the device or video system used and should conform to the specifications provided by that device/system. In an example, it is possible that a certain device, e.g. a Blu-ray disc player, is limited to only a maximum of 16 fonts, while another device, e.g. a set-top box, can support up to 32 fonts. An additional advantage of the method according to the present disclosure is that it could also enable seamless conversion from one 3D format to another assuming that the image has already been rendered on screen. This can be done by detecting the text information on screen, using for example a text detector algorithm focused in areas (e.g., bottom of the screen) that usually contain subtitle text, and checking the consistency of the text to remove outliers and/or background text, extracting the text through an OCR process while also considering and removing possible contamination between the left and right views through the consideration of the 3D display format, and re-synthesizing the text from scratch. Multiple tracks, i.e. with different languages, supporting either 2D or 3D modes could also be available on the same medium. A user may select whichever track he or she desires.

It is possible, however that a system, such as a display, performs additional post processing and conversion of the 3D data to other formats after decoding. This may include spatial filtering, denoising, deblocking or even conversion to full resolution. Additional residual information may also be used in some systems to enhance quality in, e.g., a scalable method. Although some of these processes could be done on the rendered subtitle text and or graphic overlays without affecting performance significantly, in some other cases, especially in a scalable solution, it is possible that artifacts could be introduced including decoding drift, sharpness loss or other issues.

In this scenario, and in a different embodiment, the dual event track is not rendered on the decoding device but instead converted into metadata that is passed to the final rendering device, i.e. the display. The included metadata can provide information about the original (bitstream) 3D video format, but also the method that should be used for the final rendering given the display format that is to be used. In particular, the metadata can signal that the original content was in side by side mode, and the preferred conversion for other formats such as checkerboard, or line interleaved displays may include certain interpolation algorithms such as the use of a certain filter (e.g., 6 tap H.264 based filter, bilinear, bicubic, lanczos etc). The overlays and text tracks are rendered only after all video has been rendered, while these overlays may also be enhanced with the overlays of the display or other intermediate devices (e.g. a receiver).

According to a further embodiment of the present disclosure, multiple subtitles and/or graphic overlays on the same view can be provided, each subtitle having different depth. A possible application of such embodiment could be a 3D video that contains multiple subjects (e.g., actors or even other sound effects), where each subject is at a different depth. Subtitles in this context could be associated with the depth of each subject instead of having them on a fixed 3D plane. This would make it far more natural for the viewer to watch 3D. Such embodiment can be applied in addition to or instead of the above discussed embodiments. A tracking process for each subject could also be used even though the content creator can also perform a manual depth assignment.

The methods described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

The examples set forth above are provided to give those of ordinary skill in the art a complete disclosure and description of how to make and use the embodiments of the method for embedding subtitles and/or graphic overlays in a 3D or multi-view video application of the disclosure, and are not intended to limit the scope of what the inventors regard as their disclosure. Modifications of the above-described modes for carrying out the disclosure may be used by persons of skill in the video art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A method for embedding subtitles and/or graphic overlays in a 3D or multi-view video application to form a subtitled and/or overlaid 3D or multi-view video application, comprising:

provi ding a plurality of two or more views, wherein view disparities are present between the views in order to allow subsequent formation of the 3D or multi-video application;

providing the subtitles and/or graphic overlays separately for each view based on the view disparities, wherein at least one view is provided with subtitles and/or graphic overlays with a different representation from the subtitle and/or graphic overlays of at least one other view among the plurality of two or more views; and processing the plurality of two or more views and the subtitles and/or graphic overlays to form the subtitled and/or overlaid 3D or multi-view video application wherein the different representation comprises at least one of different color, sharpness, and outlines, and wherein the provided subtitles and/or graphic overlays are previously embedded with the plurality of two or more views before the processing, and further comprising before the processing:

detecting the plurality of two or more views to locate previously embedded subtitles and/or graphic overlays;

extracting the previously embedded subtitles and/or graphic overlays;

removing artifacts introduced between the plurality of two or more views based on a first 3D display format of a 3D or multi-view video associated with the previously embedded subtitles and/or graphic overlays; and generating subtitles and/or graphic overlays to be embedded in the 3D or multi-view video application based on a second 3D display format, wherein the second 3D display format is different from the first 3D display format, wherein the processing is performed between the plurality of two or more views and the generated subtitles and/or graphic overlays.

2. The method of claim 1, wherein providing the subtitles and/or graphic overlays separately for each view comprises embedding the subtitles and/or graphic overlays in each view separately for each view and wherein processing the plurality of two or more views and the subtitles and/or graphic overlays comprises processing views embedded with the subtitles and/or graphic overlays to form the subtitled and/or overlaid 3D or multi-view video application.

3. The method of claim 2, wherein the subtitles and/or graphic overlays are sampled before embedding.

4. The method of claim 1, wherein:
the metadata comprises at least one of information pertaining to sampling methods of the 3D or multi-view video associated with the subtitles and/or graphic overlays and information pertaining to multiplexing methods of the 3D or multi-view video associated with the subtitles and/or graphic overlays, and
the processing the plurality of two or more views and the subtitles and/or graphic overlays is based on the metadata.

5. The method of claim 1, wherein the 3D format comprises at least one of information pertaining to sampling methods of the 3D or multi-view video application associated with the subtitles and/or graphic overlays and information pertaining to multiplexing methods of the 3D or multi-view video application associated with the subtitles and/or graphic overlays.

6. The method of claim 1, wherein the different representation further comprises at least one of different depth, different offset, and different shade orientation.

7. The method of claim 6, wherein the different representation is adjustable when forming the subtitled and/or graphic overlays for 3D or multi-view video applications.

8. The method of claim 7, wherein the depth is adjustable when forming the subtitled and/or overlaid 3D or multi-view video application.

9. The method of claim 1, wherein one or more aspects of the different representation are adjustable by a user when providing the subtitles and/or graphic overlays separately for each view.

10. The method of claim 9, wherein one or more adjusted aspects of the different representation are automatically generated for each view as soon as the one or more adjusted aspects have been selected by the user.

11. The method of claim 1, wherein the different representation is automatically generated for each view based on the view disparities.

12. The method of claim 1, wherein providing the subtitles and/or graphic overlays separately for each view comprises attaching the subtitles and/or graphic overlays to a video file comprised of the plurality of two or more views.

13. The method of claim 12, wherein the subtitles and/or graphic overlays are in OpenType or TrueType format.

14. The method of claim 12, wherein the subtitles comprise vector-based or raster-based fonts.

15. The method of claim 1, wherein the provided subtitles and/or graphic overlays comprise pre-rendered text.

16. The method of claim 15, wherein the pre-rendered text comprises transparency information.

17. The method of claim 1, wherein each view comprises multiple subtitles and/or graphic overlays, each subtitle and/or graphic overlay having a different depth.

18. The method according to claim 1, wherein the graphic overlays are selected from the set comprising one or more of graphics, buttons, arrows, captions, banners, and picture in picture information.

19. The method of claim 1, wherein text and/or image data associated with the subtitles and/or graphic overlays of the at least one view are the same as text and/or image data associated with the subtitles and/or graphic overlays of the at least one other view.

20. The method of claim 1, wherein the processing comprises aligning and formatting the subtitles and/or graphic overlays associated with each view according to a 3D format associated with the 3D or multi-view video application.

21. A method for embedding subtitles and/or graphic overlays in a 3D or multi-view video application, comprising:
providing a plurality of two or more views, wherein view disparities are present between the views in order to allow subsequent formation of the 3D or multi-video application;
providing the subtitles and/or graphic overlays separately for each view based on the view disparities;
converting the provided subtitles and/or graphic overlays as metadata; and
processing the plurality of two or more views and the subtitles and/or graphic overlays based on the metadata to form a subtitled and/or overlaid 3D or multi-view video application,
wherein the metadata comprises at least one of information pertaining to sampling methods of a 3D or multi-view video associated with the subtitles and/or graphic overlays and information pertaining to multiplexing methods of the 3D or multi-view video associated with the subtitles and/or graphic overlays, and
wherein the provided subtitles and/or graphic overlays are previously embedded with the plurality of two or more views before the processing, and further comprising before the processing:
detecting the plurality of two or more views to locate previously embedded subtitles and/or graphic overlays;
extracting the previously embedded subtitles and/or graphic overlays;
removing artifacts introduced between the plurality of two or more views based on a first 3D display format of a 3D or multi-view video associated with the previously embedded subtitles and/or graphic overlays; and
generating subtitles and/or graphic overlays to be embedded in the 3D or multi-view video application based on a second 3D display format, wherein the second 3D display format is different from the first 3D display format,
wherein the processing is performed between the plurality of two or more views and the generated subtitles and/or graphic overlays.

22. The method of claim 21, wherein providing the subtitles and/or graphic overlays separately for each view comprises providing at least one view with subtitle and/or graphic overlays with a different representation from the subtitle and/or graphic overlays of other views.

23. The method of claim 22, wherein the different representation comprises at least one of different color, different sharpness, different outlines, different depth, different offset, and different shade orientation.

24. The method of claim 21, wherein each view comprises multiple subtitles and/or graphic overlays, each subtitle and/or graphic overlay having a different depth.

* * * * *